(12) United States Patent
Li et al.

(10) Patent No.: US 11,920,763 B1
(45) Date of Patent: Mar. 5, 2024

(54) PROJECTION LAMP

(71) Applicant: Zhengzhong Li, Shaoyang (CN)

(72) Inventors: Zhengzhong Li, Shaoyang (CN);
Wenming Li, Shaoyang (CN)

( * ) Notice: Subject to any disclaimer, the term of this patent is extended or adjusted under 35 U.S.C. 154(b) by 0 days.

(21) Appl. No.: 18/451,343

(22) Filed: Aug. 17, 2023

(51) Int. Cl.
*F21V 14/02* (2006.01)

(52) U.S. Cl.
CPC .................................. *F21V 14/02* (2013.01)

(58) Field of Classification Search
CPC .......... G09F 13/34; G09F 13/36; G09F 13/32; G09F 13/30; F21V 14/025; F21V 14/02; G03B 21/2046
See application file for complete search history.

(56) References Cited

U.S. PATENT DOCUMENTS

| | | | |
|---|---|---|---|
| 9,157,589 B2 | 10/2015 | Chien | |
| 10,454,402 B2 | 10/2019 | Yong | |
| 11,092,301 B2 | 8/2021 | Zheng et al. | |
| 11,428,383 B1 | 8/2022 | Zheng et al. | |
| 2016/0313636 A1* | 10/2016 | Chien | F21V 21/08 |
| 2018/0224729 A1 | 8/2018 | Sum | |

FOREIGN PATENT DOCUMENTS

GB 2249164 A * 4/1992 ............... F21S 8/00

OTHER PUBLICATIONS

Innovation Q+ NPL search (Year: 2023).*

* cited by examiner

*Primary Examiner* — Anabel Ton

(57) ABSTRACT

A projection lamp, including a housing, a first light-emitting component, a driving component, and a film, wherein a light-transmitting sheet is provided on one side of the housing, the first light-emitting component comprises a lamp holder provided in the housing, a main control board fixed on the lamp holder, and a first light source mounted on the main control board, the first light source is arranged away from a central axis of the lamp holder, the driving component is in driving connection with the lamp holder so as to drive the lamp holder to rotate around the central axis of the lamp holder, and the film is arranged in the housing and positioned between the first light source and the light-transmitting sheet. The first light-emitting component further includes a condenser lens, and the condenser lens is sleeved on the first light source.

20 Claims, 5 Drawing Sheets

US 11,920,763 B1

PROJECTION LAMP

TECHNICAL FIELD

The present utility model relates to the technical field of projection lamps, and in particular, to a projection lamp.

BACKGROUND

The projection lamp uses the principle of optical projection to project a pattern content on a LOGO light sheet onto a wall of a building or the ground by adopting a high-brightness light source, so as to form an image display and an advertising effect with a rich visual impact. The projection lamp has a novel and special media form, a dynamic visual effect, and can well attract the attention of consumers. The projection lamp is ubiquitous and is widely applied to places such as a shopping mall, a hotel, and KTV.

The light source and the film of the existing projection lamp are in a static state, and only static patterns can be projected, which cannot effectively attract the attention of consumers and has a poor display effect.

SUMMARY

A primary objective of the present utility model is to provide a projection lamp, which aims to solve the problem that a projection pattern of the existing projection lamp is single and has no diversity.

In order to achieve the objective, the present utility model provides a projection lamp, comprising:

- a housing, wherein a light-transmitting sheet is provided on one side of the housing;
- a first light-emitting component, wherein the first light-emitting component comprises a lamp holder provided in the housing, a main control board fixed on the lamp holder, and a first light source mounted on the main control board, and the first light source is arranged away from a central axis of the lamp holder;
- a driving component, wherein the driving component is in driving connection with the lamp holder so as to drive the lamp holder to rotate around the central axis of the lamp holder; and
- a film, wherein the film is arranged in the housing and positioned between the first light source and the light-transmitting sheet.

Optionally, the projection lamp further comprises a first mounting seat provided in the housing, the first mounting seat is provided with a first mounting groove, and the lamp holder is mounted in the first mounting groove.

Optionally, the first light-emitting component further comprises a limiting member, a limiting seat is convexly provided on a bottom wall of the first mounting groove, the lamp holder is sleeved on the limiting seat, and the limiting member is fixed on the limiting seat and limits the lamp holder in the first mounting groove.

Optionally, the lamp holder is provided with a second mounting groove, the limiting member is arranged in the second mounting groove, a first limiting structure is provided on an outer wall of the limiting member, and a second limiting structure engaged with the first limiting structure is provided on an inner wall of the second mounting groove.

Optionally, a first abutment ring is convexly arranged on a bottom wall of the first limiting structure.

Optionally, a second abutment ring is convexly arranged on a bottom wall of the lamp holder.

Optionally, the first light-emitting component further comprises a power supply slip ring, the lamp holder, the limiting member, and the first mounting seat are all provided with mounting through holes, and the power supply slip ring is arranged in the mounting through holes and electrically connected to the main control board.

Optionally, the driving component comprises a motor and a driving gear arranged on a driving shaft of the motor, the first mounting seat is provided with a third mounting groove, the motor is arranged in the third mounting groove, and a rack engaged with the driving gear is arranged on an outer wall of the lamp holder.

Optionally, the first light-emitting component further comprises a condenser lens, and the condenser lens is sleeved on the first light source.

Optionally, the projection lamp further comprises a second mounting seat arranged in the housing, the second mounting seat has a first opening and a second opening that are oppositely arranged, the film is arranged at the first opening, and the light-transmitting sheet is arranged on the second opening.

Optionally, the second mounting seat has an inner cavity communicating the first opening and the second opening, and the inner cavity is tapered.

Optionally, the light-transmitting sheet is a plano-concave lens, and another surface of the plano-concave lens relative to a concave surface is in an irregular wave texture shape.

Optionally, the lamp holder, the film, and the light-transmitting sheet are all coaxially arranged.

Optionally, the projection lamp further comprises a second light-emitting component arranged in the housing, the second light-emitting component comprises a second light source and a diffractive medium, the housing is provided with a mounting hole, the diffractive medium is arranged in the mounting hole, and the second light source is arranged in the housing and emits light toward the diffractive medium.

Optionally, the projection lamp further comprises a base, the base is provided with a placing groove, and the housing is movably arranged on a groove opening of the placing groove.

Optionally, two opposite sides of the groove opening of the placing groove are recessed to form an avoidance groove.

According to the present utility model, the driving component is in driving connection with the lamp holder, the first light source is arranged away from a central axis of the lamp holder, when the driving component drives the lamp holder to rotate around the central axis of the lamp holder, the first light source is driven to rotate eccentrically around the central axis of the lamp holder, the intensity of a light changes constantly after the light passes through the film, so that a projected pattern presents a dynamic effect. Compared with a static projected pattern, the projected pattern has a better display effect and can attract more attention of consumers.

BRIEF DESCRIPTION OF DRAWINGS

In order to more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
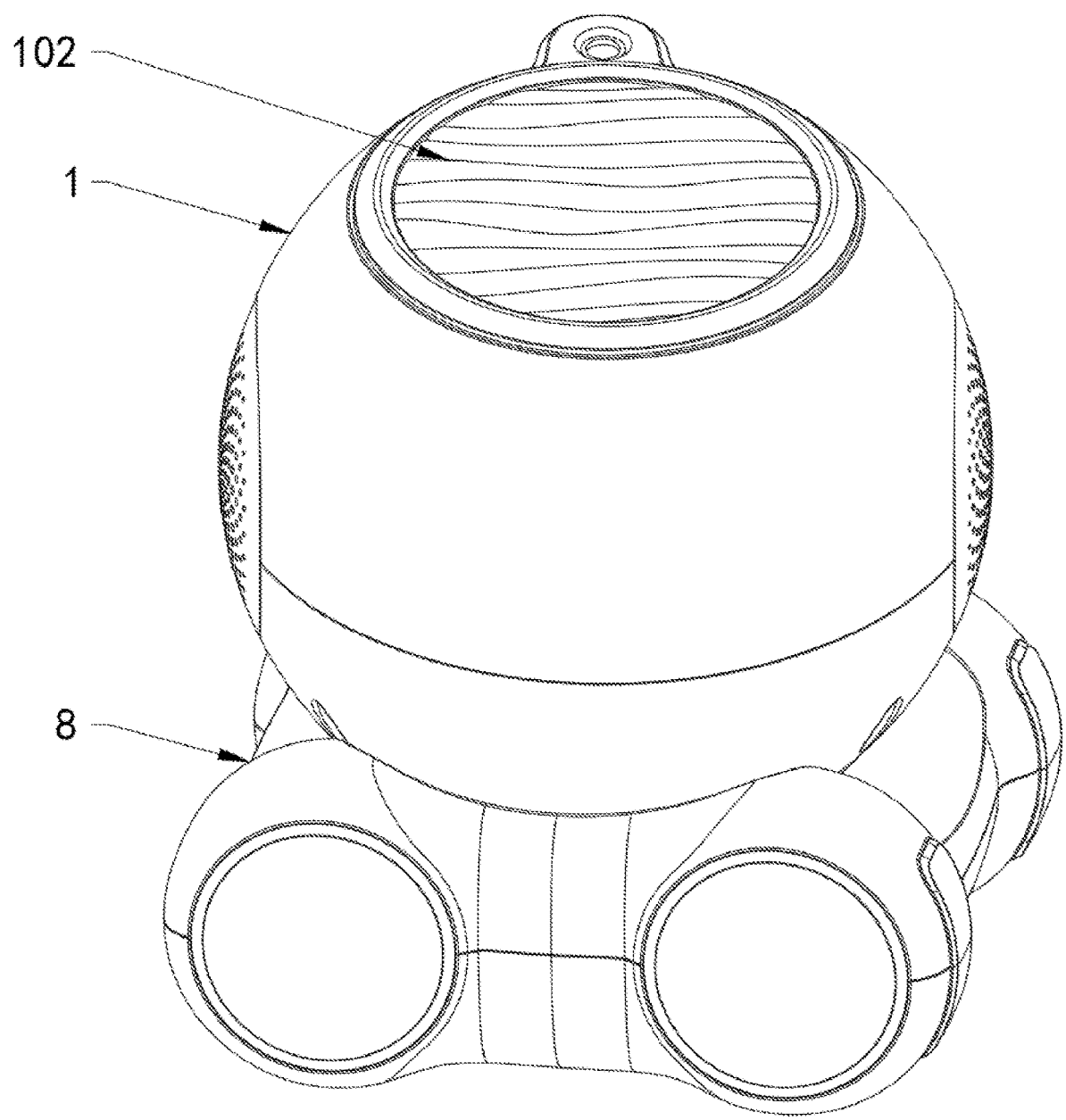
FIG. 1 is an overall perspective view of the present utility model.

The reference numbers in the drawings are indicated as follows:

- 1: housing; 3: driving component; 4: film; 5: first mounting seat; 6: second mounting seat; 7: second light-emitting component; 8: base; 101: mounting hole; 102: light-transmitting sheet; 103: button; 104: circuit board; 105: speaker; 201: lamp holder; 202: main control board; 203: first light source; 204: limiting member; 205: power supply slip ring; 206: rack; 207: condenser lens; 301: motor; 302: driving gear; 501: first mounting groove; 502: limiting seat; 503: third mounting groove; 601: first opening; 602: second opening; 603: inner cavity; 701: second light source; 702: diffractive medium; 801: placing groove; 802: avoidance groove; 2011: second mounting groove; 2012: second limiting structure; and 2041: first limiting structure.

The realization of the objectives, functional features, and advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front, and rear) are involved in the embodiments of the present utility model, the directional indications are only used to explain the relative position relationships, the motion situations and the like between individual components under a certain pose (as shown in the drawings), and if the certain pose changes, the directional indications change accordingly.

In addition, if there are descriptions relating to "first", "second", and the like in the embodiments of the present utility model, the descriptions of "first", "second", and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel solutions, and taking "A and/or B" as an example, "and/or" includes solution A, solution B, or both solution A and solution B. In addition, the technical solutions among various embodiments may be combined with each other, but the combination must be based on that this combination can be realized by those of ordinary skill in the art, and when the combination of the technical solutions is contradictory or cannot be realized, such combination of the technical solutions should not be considered to exist, and is not within the protection scope of the present utility model.

The present utility model provides a projection lamp. FIGS. 1 to 5 are specific embodiments of the projection lamp provided by the present utility model.

Referring to FIGS. 1 to 5, the projection lamp comprises a housing 1, a first light-emitting component, a driving component 3, and a film 4, wherein a light-transmitting sheet 102 is provided on one side of the housing 1, the first light-emitting component comprises a lamp holder 201 provided in the housing 1, a main control board 202 fixed on the lamp holder 201, and a first light source 203 mounted on the main control board 202, the first light source 203 is arranged away from a central axis of the lamp holder 201, the driving component 3 is in driving connection with the lamp holder 201 so as to drive the lamp holder 201 to rotate around the central axis of the lamp holder 201, and the film 4 is arranged in the housing 1 and positioned between the first light source 203 and the light-transmitting sheet 102.

Specifically, the film 4 is printed with a pattern by ink. When the light from the first light source 203 irradiates the film 4, the pattern on the film 4 can be projected. The lamp holder 201 and the film 4 are coaxially arranged, the first light source 203 is arranged away from the central axis of the lamp holder 201, that is, the first light source 203 deviates from the central axis of the film 4, so that the light emitted by the first light source 203 is projected on a part of the film 4. When the driving component 3 drives the lamp holder 201 to rotate around the central axis, the main control board 202 and the first light source 203 also rotate around the central axis of the lamp holder 201, and the intensity of a light changes constantly after the light passes through the film 4, so that a projected pattern presents a dynamic effect. Compared with a static projected pattern, this projected pattern has a better display effect and can attract more attention of consumers. The first light source 203 is an incoherent light source, and light emitted by the incoherent light source does not interfere, so that the brightness of the projected pattern is uniform, for example, the first light source 203 can be an LED lamp bead, a laser lamp, and the like, preferably, the first light source is the LED lamp bead. In the present utility model, the LED lamp bead is a point light source, and the light path of this point light source is divergent, so that the illumination intensities projected on the film are different, and thus when the first light source 203 rotates around the central axis of the lamp holder 201, the local illumination intensity of the film 4 continuously changes, so that the pattern projected by the projection lamp continuously changes, the light and shadow effect projected by the projection lamp is dynamic, and the diversity of the projection effect of the projection lamp is effectively improved.

Further, because the pattern of the film 4 is printed by ink that belongs to organic matters and is easily decomposed and discolored under strong light and at a high temperature, the color of the film 4 is easily faded in the using process and needs to be frequently changed. In the present utility model, the driving component 3 drives the first light-emitting component to rotate instead of driving the film 4 to rotate, so that the requirements on mounting and fixing the film 4 are not high, which is convenient for the mounting and disassembling of the film 4 and is easy to replace.

Figure 4:
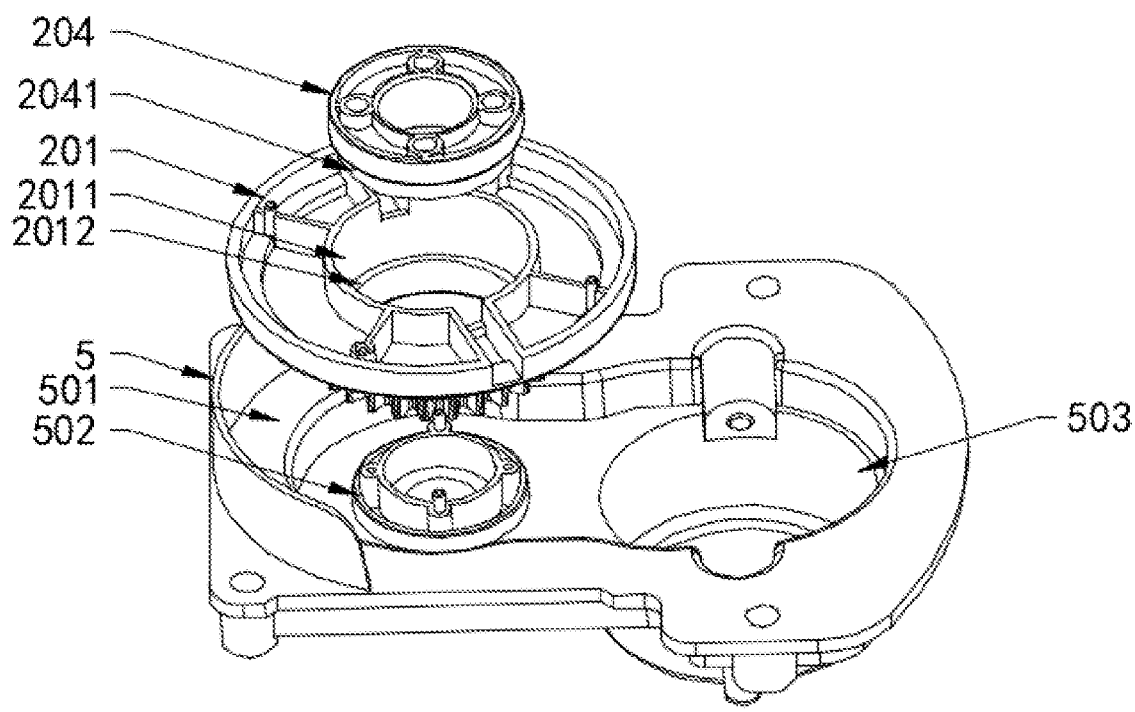
FIG. 4 is a disassembled view of a limiting member, a lamp holder, and a first mounting seat according to the present utility model.
Figure 5:
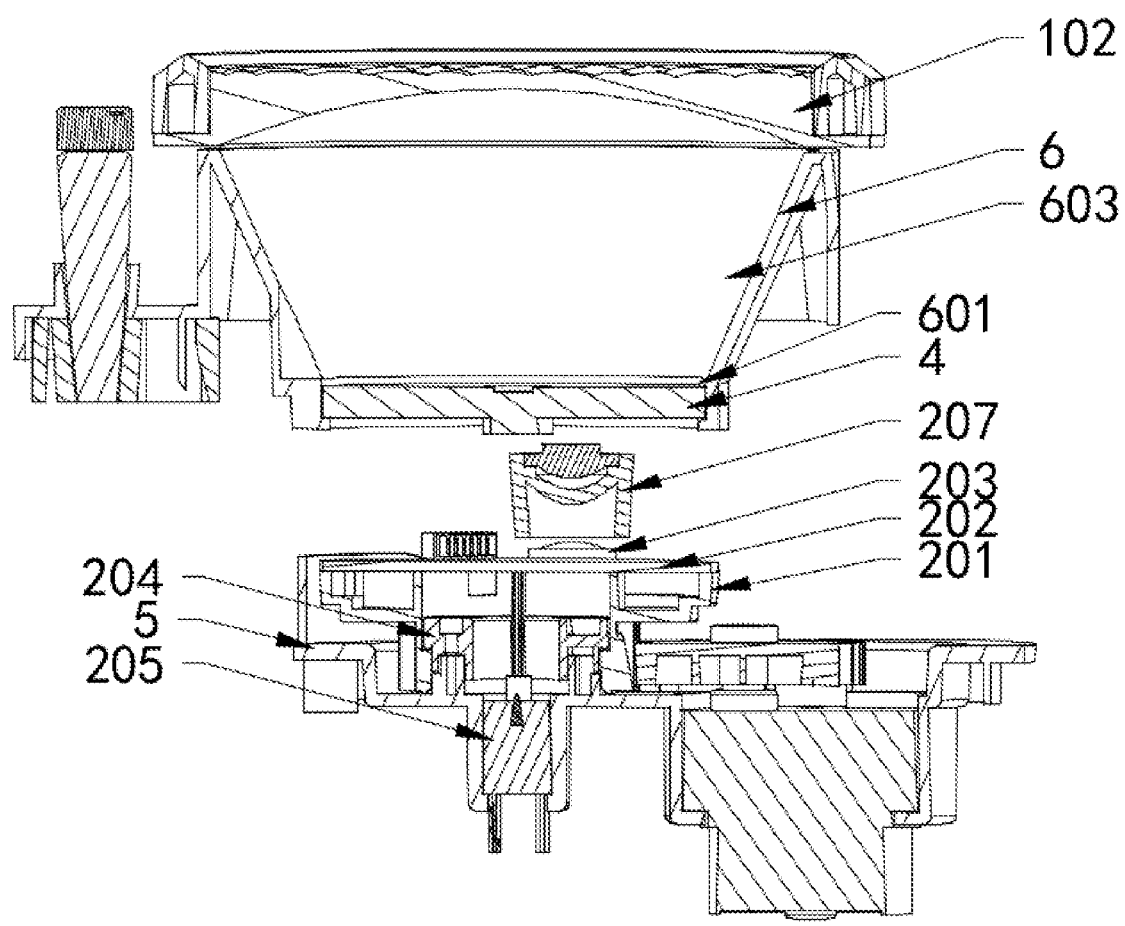
FIG. 5 is a partial sectional view of the present utility model.

Referring to FIGS. 4 and 5, the projection lamp further comprises a first mounting seat 5, the first mounting seat 5 is arranged in the housing 1, the first mounting seat 5 is provided with a first mounting groove 501, the lamp holder 201 is mounted in the first mounting groove 501, and the lamp holder 201 is rotatably connected to the first mounting groove 501.

A limiting seat 502 is convexly provided on a bottom wall of the first mounting groove 501, the lamp holder 201 is sleeved on the limiting seat 502, the limiting member 204 is fixed on the limiting seat 502, the lamp holder 201 is rotatably connected to the limiting seat 502 and the limiting member 204, the limiting member 204 is fixed with the limiting seat 502 by screws, and the lamp holder 201 is limited by the limiting member 204 and the limiting seat 502 to prevent the lamp holder 201 from being displaced during rotation.

In order to further limit the lamp holder 201, the lamp holder 201 is provided with a second mounting groove 2011, the limiting member 204 is arranged in the second mounting groove 2011, a first limiting structure 2041 is provided on an outer wall of the limiting member 204, and a second limiting structure 2012 snapped with the first limiting structure 2041 is provided on an inner wall of the second mounting groove 2011. It should be noted that the configurations of the first limiting structure 2041 and the second limiting structure 2012 are not limited herein. In the present utility model, the first limiting structure 2041 is a first limiting groove recessed on an inner wall of the lamp holder 201, the second limiting structure 2012 is a second limiting groove recessed on an outer wall of the limiting member 204, and the first limiting groove and the second limiting groove are engaged in a step shape.

A first abutment ring is convexly arranged on a bottom wall of the first limiting structure 2041. A contact area between the first limiting structure 2041 and the second limiting structure 2012 can be reduced by the first abutment ring, and therefore, when the lamp holder 201 rotates, the friction between the first limiting structure 2041 and the second limiting structure 2012 is reduced.

A second abutment ring is convexly arranged on a bottom wall of the lamp holder 201. The principle of the second abutment ring is the same as that of the first abutment ring, and is used to reduce the friction between the lamp holder 201 during rotation and the limiting seat 502.

Referring to FIGS. 2 to 5, the first light-emitting component further comprises a power supply slip ring 205, the lamp holder 201, the limiting member 204, and the first mounting seat 5 are all provided with mounting through holes, and the power supply slip ring 205 is arranged in the mounting through holes and electrically connected to the main control board 202. The main control board 202 and a power supply module of the projection lamp are conducted through the power supply slip ring 205, if a common wire is provided to supply power to the main control board 202, when the lamp holder 201 rotates and drives the main control board 202 to rotate, the wire is knotted until being disconnected. The power supply slip ring comprises a rotor connected to the main control board 202 and a stator connected to the power supply module, when the main control board 202 rotates, the rotor can rotate relative to the stator along with the main control board 202, the stator remains stationary along with the power supply module, which may keep the power supply module and the main control board 202 continuously and stably conducted, effectively prevents the wire from being knotted, and improves the stability of the connection between the main control board 202 and the power supply module and the practicability of the projection lamp.

Figure 3:
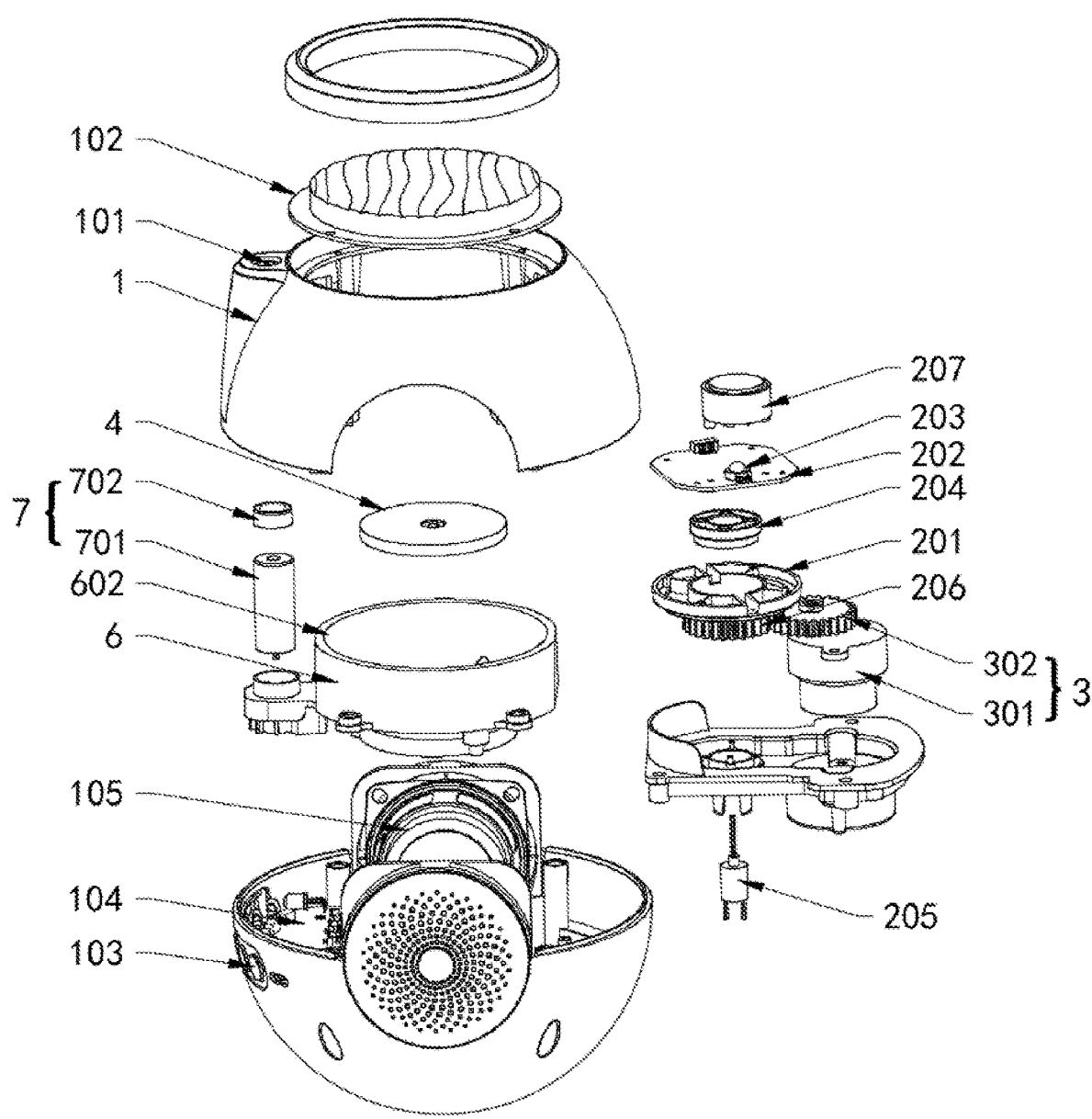
FIG. 3 is a partial exploded view of the present utility model.

Referring to FIG. 3, the driving component 3 comprises a motor 301 and a driving gear 302 arranged on a driving shaft of the motor 301, the first mounting seat 5 is provided with a third mounting groove 503, the motor 301 is arranged in the third mounting groove 503, the motor 301 is fixed by the third mounting groove 503, a rack 206 engaged with the driving gear 302 is arranged on an outer wall of the lamp holder 201, when the motor 301 rotates, the driving gear 302 is driven to rotate, and the driving gear 302 drives the lamp holder 201 to rotate through the rack 206.

The first light-emitting component further comprises a condenser lens 207, the condenser lens is sleeved on the first light source 203, and the light emitted by the first light source 203 can be more converged and projected on a part that is of the film 4 and corresponds to a position of the first light source 203 by the condensing lens 207, so that the projected pattern is brighter, and the display effect is better.

Referring to FIG. 5, the projection lamp further comprises a second mounting seat 6 arranged in the housing 1, the second mounting seat 6 has a first opening 601 and a second opening 602 that are oppositely arranged, the film 4 is arranged at the first opening 601, the light-transmitting sheet 102 is arranged on the second opening 602, and the second mounting seat 6 is tapered. A diameter of the second opening 602 is greater than that of the first opening 601, the second mounting seat 6 has an inner cavity 603 communicating the first opening 601 and the second opening 602, and this arrangement conforms to a light diffusion path of the first light source 203, can increase the projection area, and will not block the light projected by the first light source 203 through the film 4. A receiving portion for placing the film 4 extends inwardly from the inner cavity 603 near the first opening 601, so that the light of the first light source 203 passes through the film 4 and is emitted to the light-transmitting sheet 102, according to this arrangement, when the film 4 needs to be disassembled, only the light-transmitting sheet 102 needs to be taken down and then taken out through the second opening 602, which is very convenient.

Figure 2:
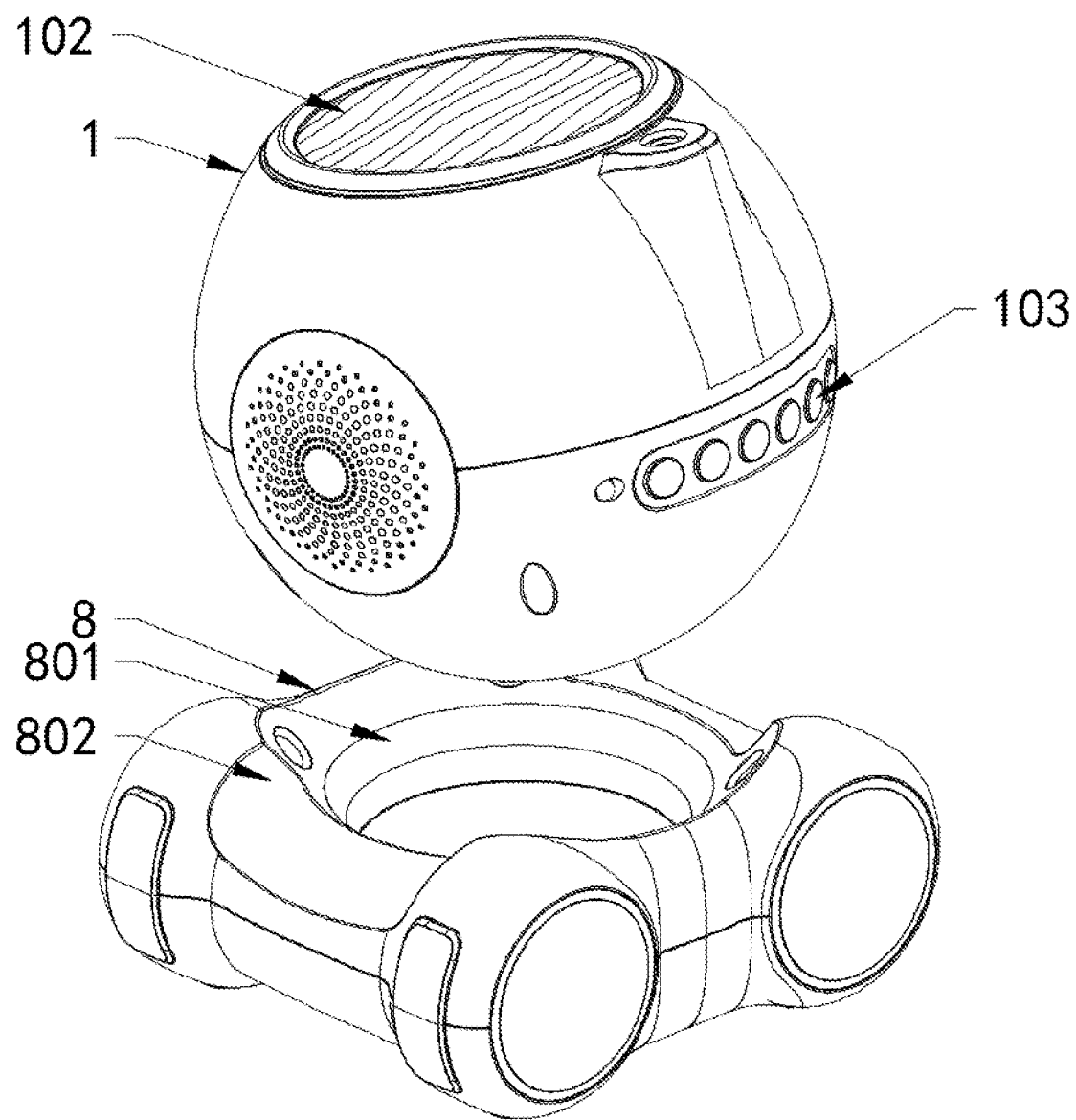
FIG. 2 is an exploded view of a housing and a base according to the present utility model.

Referring to FIGS. 2, 3, and 5, the light-transmitting sheet 102 is a plano-concave lens, and when light reaches the plano-concave lens, the emitted light is diffused, so that the plano-concave lens arranged in the present utility model may increase a projection area. Another surface of the plano-concave lens relative to a concave surface is in an irregular wave texture shape. Specifically, one side of the concave surface of the plano-concave lens faces the first light source 203, and the light projected by the first light source 203 can be converged, so that a projected pattern is brighter. In addition, a surface that is of the plano-concave lens and that is in an irregular wave texture shape can refract the light projected by the first light source 203, so that the projected pattern presents a dynamic effect.

The projection lamp further comprises a second light-emitting component 7 arranged in the housing 1, the second light-emitting component 7 comprises a second light source 701 and a diffractive medium 702, the housing 1 is provided with a mounting hole 101, the diffractive medium 702 is arranged in the mounting hole 101, and the second light source 701 is arranged in the housing 1 and emits light toward the diffractive medium 702. The light emitted by the second light source 701 can be diffracted by the diffractive medium 702 to form a diffractive light beam, that is, the light emitted by the second light source 701 irradiates on an object to form a light point, and the light point is combined with the pattern projected by the first light source 203, so that the display effect is better. Preferably, the second light source 701 is a laser lamp.

Referring to FIG. 2, the projection lamp further comprises a base 8, the base 8 is provided with a placing groove 801, and the housing 1 is movably arranged on a groove opening of the placing groove 801, and the base 8 is used to receive the housing 1.

Further, the housing 1 is placed in the placing groove 801, and an orientation of the housing can be adjusted to adjust a projection direction of the projection lamp.

Two opposite sides of the groove opening of the placing groove 801 are recessed to form an avoidance groove 802. The arrangement of the avoidance groove 802 is convenient for taking out the housing 1 from the placing groove 801 and adjusting a placement direction of the housing 1.

In addition, the projection lamp further comprises a plurality of buttons 103 provided on one side of the housing 1, a circuit board 104 provided in the housing 1, and a speaker 105 provided in the housing 1; the button 103 is connected to the circuit board 104 to control a projection mode of the projection lamp, thereby realizing the projection diversification of the projection lamp; the speaker 105 is connected to the circuit board 104, the housing 1 is provided with a through hole for transmitting the sound of the speaker 105, and the music or sales promotion information in a shopping mall can be played through the speaker 105, so that the practicability of the projection lamp is improved.

The above mentioned contents are only optional embodiments of the present utility model and are not intended to limit the patent scope of the present utility model. Under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A projection lamp, comprising:
   a housing, wherein a light-transmitting sheet is provided on one side of the housing;
   a first light-emitting component, wherein the first light-emitting component comprises a lamp holder provided in the housing, a main control board fixed on the lamp holder, and a first light source mounted on the main control board, and the first light source is arranged away from a central axis of the lamp holder;
   a driving component, wherein the driving component is in driving connection with the lamp holder so as to drive the lamp holder to rotate around the central axis of the lamp holder; and
   a film, wherein the film is arranged in the housing and positioned between the first light source and the light-transmitting sheet;
   wherein the first light-emitting component further comprises a condenser lens, and the condenser lens is sleeved on the first light source.

2. The projection lamp according to claim 1, wherein the projection lamp further comprises a first mounting seat provided in the housing, the first mounting seat is provided with a first mounting groove, and the lamp holder is mounted in the first mounting groove.

3. The projection lamp according to claim 2, wherein the first light-emitting component further comprises a limiting member, a limiting seat is convexly provided on a bottom wall of the first mounting groove, the lamp holder is sleeved on the limiting seat, and the limiting member is fixed on the limiting seat and limits the lamp holder in the first mounting groove.

4. The projection lamp according to claim 3, wherein the lamp holder is provided with a second mounting groove, the limiting member is arranged in the second mounting groove, a first limiting structure is provided on an outer wall of the limiting member, and a second limiting structure engaged with the first limiting structure is provided on an inner wall of the second mounting groove.

5. The projection lamp according to claim 4, wherein a first abutment ring is convexly arranged on a bottom wall of the first limiting structure.

6. The projection lamp according to claim 3, wherein a second abutment ring is convexly arranged on a bottom wall of the lamp holder.

7. The projection lamp according to claim 3, wherein the first light-emitting component further comprises a power supply slip ring, the lamp holder, the limiting member, and the first mounting seat are all provided with mounting through holes, and the power supply slip ring is arranged in the mounting through holes and electrically connected to the main control board.

8. The projection lamp according to claim 2, wherein the driving component comprises a motor and a driving gear arranged on a driving shaft of the motor, the first mounting seat is provided with a third mounting groove, the motor is arranged in the third mounting groove, and a rack engaged with the driving gear is arranged on an outer wall of the lamp holder.

9. The projection lamp according to claim 2, wherein the projection lamp further comprises a second mounting seat arranged in the housing, the second mounting seat has a first opening and a second opening that are oppositely arranged, the film is arranged at the first opening, and the light-transmitting sheet is arranged on the second opening.

10. The projection lamp according to claim 9, wherein the second mounting seat has an inner cavity communicating the first opening and the second opening, and the inner cavity is tapered.

11. A projection lamp, comprising:
    a housing, wherein a light-transmitting sheet is provided on one side of the housing;
    a first light-emitting component, wherein the first light-emitting component comprises a lamp holder provided in the housing, a main control board fixed on the lamp holder, and a first light source mounted on the main control board, and the first light source is arranged away from a central axis of the lamp holder;
    a driving component, wherein the driving component is in driving connection with the lamp holder so as to drive the lamp holder to rotate around the central axis of the lamp holder; and
    a film, wherein the film is arranged in the housing and positioned between the first light source and the light-transmitting sheet;
    wherein the light-transmitting sheet is a plano-concave lens, and another surface of the plano-concave lens relative to a concave surface is in an irregular wave texture shape.

12. A projection lamp, comprising:
    a housing, wherein a light-transmitting sheet is provided on one side of the housing;
    a first light-emitting component, wherein the first light-emitting component comprises a lamp holder provided in the housing, a main control board fixed on the lamp holder, and a first light source mounted on the main control board, and the first light source is arranged away from a central axis of the lamp holder;

a driving component, wherein the driving component is in driving connection with the lamp holder so as to drive the lamp holder to rotate around the central axis of the lamp holder; and a film, wherein the film is arranged in the housing and positioned between the first light source and the light-transmitting sheet;

wherein the lamp holder, the film, and the light-transmitting sheet are all coaxially arranged.

13. The projection lamp according to claim 1, wherein the projection lamp further comprises a second light-emitting component arranged in the housing, the second light-emitting component comprises a second light source and a diffractive medium, the housing is provided with a mounting hole, the diffractive medium is arranged in the mounting hole, and the second light source is arranged in the housing and emits light toward the diffractive medium.

14. The projection lamp according to claim 1, wherein the projection lamp further comprises a base, the base is provided with a placing groove, and the housing is movably arranged on a groove opening of the placing groove.

15. The projection lamp according to claim 14, wherein two opposite sides of the groove opening of the placing groove are recessed to form an avoidance groove.

16. The projection lamp according to claim 11, wherein the projection lamp further comprises a second light-emitting component arranged in the housing, the second light-emitting component comprises a second light source and a diffractive medium, the housing is provided with a mounting hole, the diffractive medium is arranged in the mounting hole, and the second light source is arranged in the housing and emits light toward the diffractive medium.

17. The projection lamp according to claim 12, wherein the projection lamp further comprises a second light-emitting component arranged in the housing, the second light-emitting component comprises a second light source and a diffractive medium, the housing is provided with a mounting hole, the diffractive medium is arranged in the mounting hole, and the second light source is arranged in the housing and emits light toward the diffractive medium.

18. The projection lamp according to claim 11, wherein the projection lamp further comprises a base, the base is provided with a placing groove, and the housing is movably arranged on a groove opening of the placing groove.

19. The projection lamp according to claim 12, wherein the projection lamp further comprises a base, the base is provided with a placing groove, and the housing is movably arranged on a groove opening of the placing groove.

20. The projection lamp according to claim 18, wherein two opposite sides of the groove opening of the placing groove are recessed to form an avoidance groove.

\* \* \* \* \*